Figure 1:
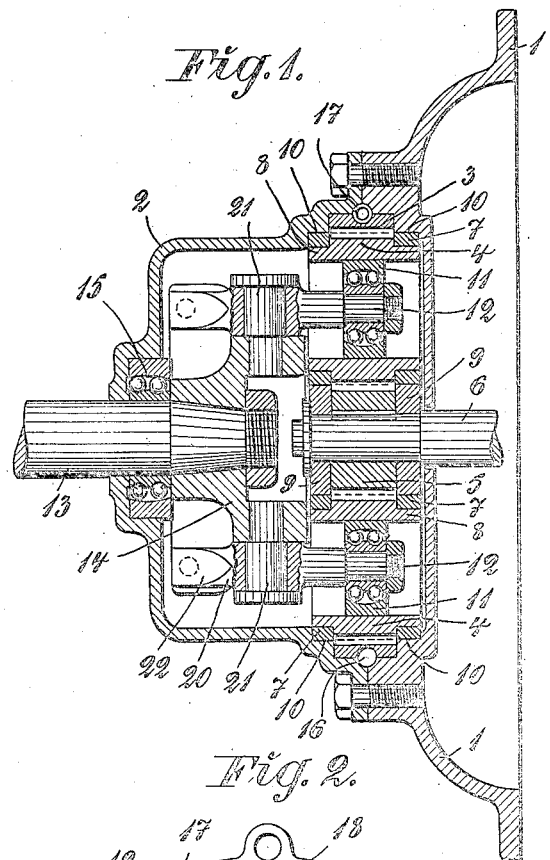

May 25, 1926.

C. A. HULT

PLANET GEAR

Filed Feb. 21, 1924    2 Sheets-Sheet 1

1,586,309

Inventor
Carl Alrik Hult.
per [signature]
Attorney.

May 25, 1926.
C. A. HULT
PLANET GEAR
Filed Feb. 21, 1924    2 Sheets-Sheet 2
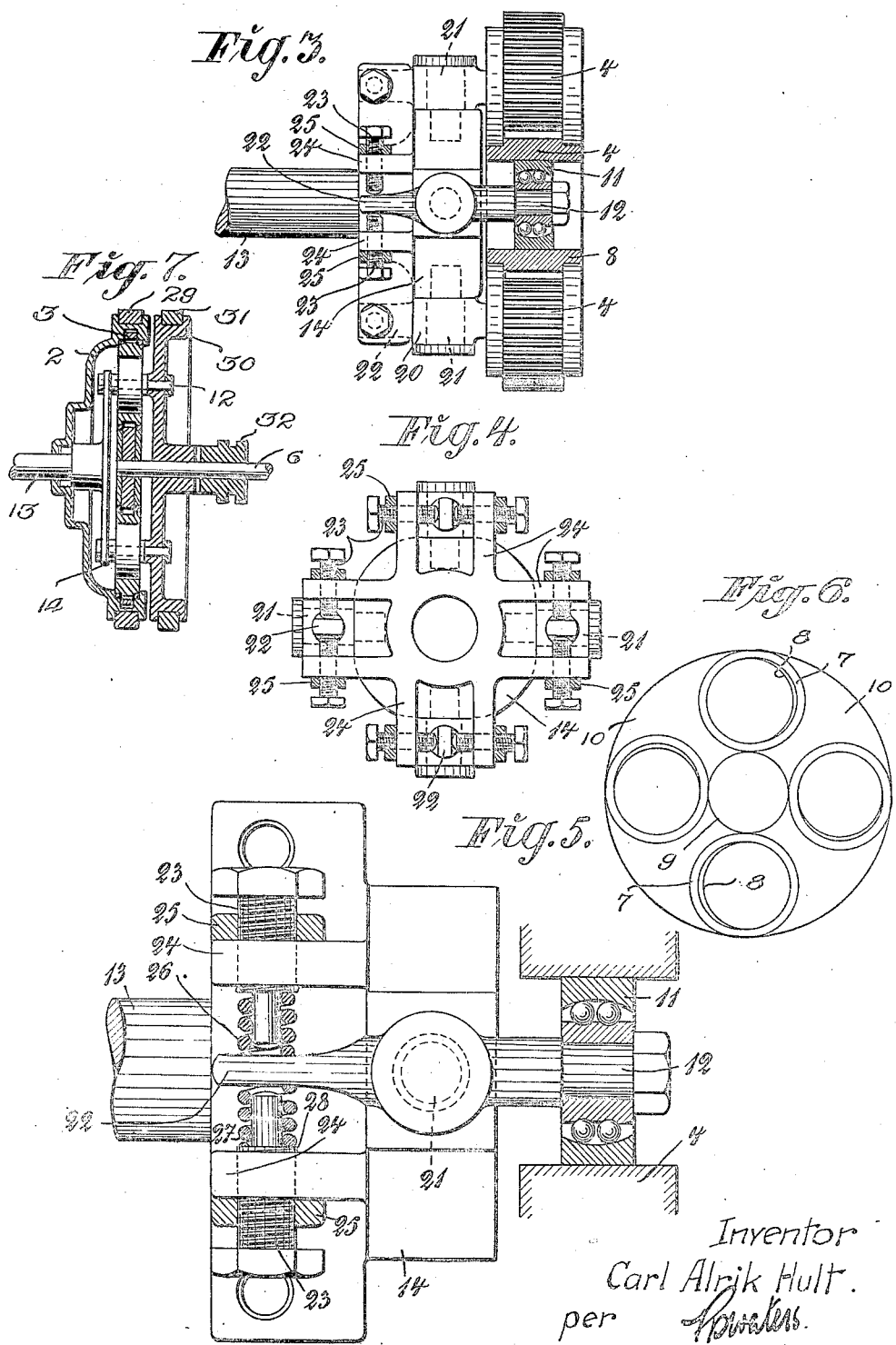
Inventor
Carl Alrik Hult.
per *Powless*
Attorney.

Patented May 25, 1926.

1,586,309

UNITED STATES PATENT OFFICE.

CARL ALRIK HULT, OF STOCKHOLM, SWEDEN.

PLANET GEAR.

Application filed February 21, 1924. Serial No. 694,290.

The invention relates to planet gears and the principal object of the invention is to provide means for fixing the planet pinions radially in place so as to relieve the shafts of the planet pinions from radial pressures. To this end the planet pinions are provided, according to the invention, with centring rings loosely mounted on the hub of the pinions and arranged to run on outer and inner roller races so as to fix the planet pinions in place radially. The planet gear will thus form a roller bearing, in which the planet pinions operate as rollers.

The said arrangement will also have the effect of giving the gear a smooth and noiseless running owing to the roller races operating to damp such irregular and oscillatory movements which might be caused by lost motion in the gearing. The efficiency of the arrangement in that respect may be increased by making the centring rings of the planet pinions elastic so as to be kept in frictional engagement with the outer and inner races by the spring action of the rings. This arrangement, on the other hand, affords another advantage inasmuch as the centring rings and the roller races will then form a friction gear, which will take over a portion of the power transmission, while relieving the spur gear to a corresponding extent, the wear of the gear being thus considerably reduced.

Another object of the invention is to ensure a uniform distribution of the power on the different planet pinions thereby preventing one or more of the planet pinions from being exposed to greater stresses than the other pinions on account of some inaccuracy in the manufacturing of the gear that is impossible to obviate entirely in practice. The risk of such an uneven distribution of the load would make it necessary to give the gear larger dimensions than otherwise required. In order to overcome this disadvantage the planet pinions or their journals respectively are adjustably or resiliently mounted in such a way as to be capable of being displaced in a peripheral direction relatively to each other, or to yield with a suitable counterpressure to tangential forces respectively.

The invention may be applied to planet gears of different kinds, but it is particularly adapted to be used in such motors, which are provided with a built-in reduction gear. A planet gear according to this invention, when used as a reduction gear in motors, will afford a considerable saving of space on account of the gearing serving at the same time as a bearing. Thus, it may be possible to mount the gear in one of the bearing brackets of the motor without increasing considerably the axial length of the motor.

Figure 2:
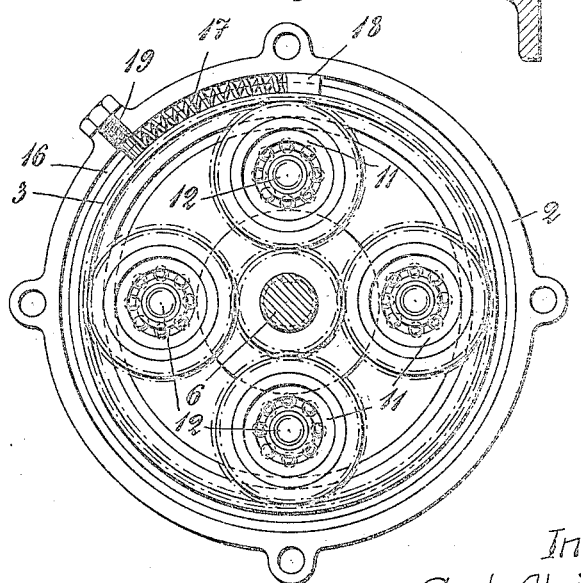

The invention will be more closely described with reference to the accompanying drawings, which illustrate different embodiments of the invention. Fig. 1 shows an axial section of the gear mounted in the bearing bracket of an electric motor. Fig. 2 shows the gear as seen from the right hand side in Fig. 1, the bearing bracket being removed. Fig. 3 is a side view of the planet pinion support and Fig. 4 is an end view thereof. Fig. 5 illustrates on a larger scale by way of example a device for obtaining an automatic adjustment of the planet pinions during the running. Fig. 6 illustrates schematically the arrangement and the operation of the elastic centring rings of the planet pinions. Fig. 7 shows another form of the invention adapted to be used as a change speed gear.

In the embodiment shown in Figs. 1–4 the gear is mounted in and carried by the bearing bracket 1 of an electric motor. The gear is enclosed between the bearing bracket and an outer casing 2. Loosely inserted between said parts is an internal tooth wheel or ring 3 rotatable in an annular groove. The planet pinions 4 are meshing with the toothed ring 3 and the central spur wheel 5 of the gear, said spur wheel being fixed on the motor shaft 6. The planet pinions are provided with roller races or centring rings 7 which are loosely mounted on annular shoulders 8 on the hubs of the pinions. Said rings 7 are arranged to bear inwardly against roller races 9 arranged laterally of the central spur wheel and the outer surface of which coincides with the pitch circle of the central spur wheel. Further, the centring rings 7 are arranged to roll on outer roller races 10 turned out in the bearing bracket 1 and the casing 2 on each side of the rim of the toothed ring 3, the width of said roller races being equal to the pitch diameter of the toothed ring 3. The centring rings 7 will thus rung between shoulders formed by the turning out of the races 10, whereby they will be kept in place on the planet pinions. Mounted in spherical ball bearings 11 inserted in the central bore of the planet pinions are the journals 12 of the pinions. which are secured in a manner hereinafter to be described to a planet pinion support 14 fixed to the low speed shaft 13 of the motor. The shaft 13 is mounted in a separate ball bearing 15 inserted in a bearing sleeve of the casing 2.

The bearing bracket 1, the casing 2 and the toothed ring 3 are grooved so as to form an annular channel 16 of a circular cross section, in which a helical spring 17 is disposed, pressing with one end against a stud 18 on the toothed ring 3, Fig. 2, and with the other end against a stop screw 19 screwed into the casing.

When the motor is started, a planetary motion is imparted to the planet pinions 4 in the same direction as that of the driving shaft 6, the pinions being thereby rotated on their journals 12. As a consequence, the planet pinion support 14 and the shaft 13 will be rotated at a considerably lower speed than the driving shaft. At the starting moment the spring 17 is compressed on account of the tendency of the toothed ring 3 to turn in its groove in an opposite direction to the shafts 6 and 13. The spring 17 then serves as a resilient abutment for the toothed ring, thereby giving the gear a smooth running. Evidently, several helical springs may be provided for this purpose, and other members than springs may be used, for example elastic rubber buffers. The arrangement of the elastic members may be varied provided the object aimed at is attained.

Owing to the described arrangement of the roller races and the centring rings the outer toothed ring 3, the planet pinions 4 and the central spur wheel 5 will be fixed relatively to each other and centred in a radial direction, and at the same time the gear will form a roller bearing for the shaft 6 as well as the shaft 13, the planet pinions forming the rollers in that bearing.

The centring rings 7 as well as the roller races 9 may either be fixed to the planet pinions 4 and the shaft 6 respectively, or loosely mounted thereon. Preferably, the rings 7 are loosely mounted in order to facilitate the assembling and dismounting of the gear and, particularly, to make it possible to use elastic rings, which will bear resiliently with a certain pressure against the outer and inner roller races 10 and 9 respectively, thereby causing the rings to be kept in frictional engagement with said races so as to form a friction gear through which a portion of the power may be transmitted. In addition to the spur gearing being thus partly unloaded by the friction gear, the latter will protect the teeth from shocks and vibrations during the running and, as a consequence, the gear will run smoothly and noiselessly.

The arrangement last mentioned is illustrated in Fig. 6 from which it will appear that the centring rings are somewhat wider than the annular shoulders 8 of the planet pinions. The rings will therefore be compressed radially but, the thickness of the rings being equal to the radial distance between the shoulders and the roller races 9 and 10, the space between said shoulders and roller races will be entirely filled up by the rings. The parts of the gear will therefore be perfectly centred in a radial direction while at the same time the rolling surfaces will engage each other with a certain pressure.

The above mentioned arrangement for obtaining a uniform distribution of the power transmitted through the gear on the different planet pinions consists, in the example illustrated, of a combined adjusting device affording partly an adjustment by hand, whereby the planet pinions may be set approximately in the right position in relation to each other, and partly an automatic resilient adjustment whereby small differences in the power distribution which may still remain, will be practically entirely eliminated during the running. To this end the journals of the planet pinions are adjustably mounted on the planet pinion support 14. In the example shown in the drawings each journal 12 forms one arm of a lever 20 pivoted on a pin 21 radially inserted in the support 14, the other arm 22 of said lever being arranged to be jammed and kept in place between two set screws 23. The screws last mentioned are threaded into screw fixtures 24 formed by flanges or ribs on the pinion support, and may be locked by means of nuts 25. The fixture of the journals 12 is not, however, perfectly rigid, but to some extent resilient or elastic so as to eliminate automatically such differences in the distribution of the power between the planet pinions which may still remain after the adjustment of the journals or which may occur during the running.

Fig. 5 shows on a larger scale the arrangement of the resilient or elastic fixture of the journals. The resiliency may be obtained by giving the arm 22 such dimensions that it will be elastic to some extent and capable of yielding to pressures in the direction of the screws 23. In addition thereto elastic members may be interposed between the arm and the set screws, said elastic members in the example shown consisting of helical springs 27 disposed between the arm 22 and shoulders 28 on the set screws.

It will be seen from the drawing that the arrangement described, after the set screws 23 having been loosened, will allow of a certain adjustment of the planet pinions within the limits of the lost motion of the gearing. In connection with the mounting and assembling of the gear and after the shaft 6 has been braked fast and the srews 23 have been loosened the planet pinions are adjusted by hand by turning the journals 12 on their pivots and causing the pinions to bear in the same direction and with a slight pressure against the teeth of the outer or inner gear wheel 3 or 5 or both. The journals 12 are then secured in the positions in which they have been set, by adjusting and locking the screws 23. Such differences in the power distribution between the planet pinions which may remain after the manual adjustment, are eliminated during the running through the described resilient fixture of the journals of the planet pinions.

In the adjustable arrangement of the planet pinions the spherical ball bearings 11 have another essential purpose in addition to that due to it under ordinary circumstances in case of the journals 12 being rigidly secured to the pinion support. In the present instance the spherical ball bearings will co-operate in such a manner with the journals that the geometrical axes of the planet pinions are kept exactly parallel with the axis of the planet gear even at a considerable angular displacement of the journals 12. The gear will thus obtain a smooth running and the possibility of an uneven wear of the teeth is entirely eliminated.

In the embodiment shown in Fig. 7 the casing 2 together with the toothed ring 3 mounted therein is rotatable on the shaft 13 and its outer circumference is formed into a brake disk surrounded by a brake strap or the like 29. Moreover, the journals 12 of the planet pinions are connected with a disk 30 mounted on the shaft 6, said disk being likewise in the form of a brake disk and surrounded by a brake strap 31. The hub of the disk 30 is provided with clutch teeth or the like adapted to engage with the teeth of a coupling sleeve 32 displaceable axially on the shaft 6 and connected with the shaft by means of a key and a key slot so as to be rotated with the shaft. If said coupling sleeve 32 is displaced to engage the disk 30, the shaft 6 and 13 will be rigidly coupled together so as to be rotated at the same speed. If, on the other hand, the coupling sleeve 32 is disengaged and the brake strap 29 is made inoperative, the shaft 13 will be stopped, if its rotation is opposed by some resistance, the casing 2 being then rotated in a direction opposite to the direction of rotation of the shaft 6. If the brake strap 29 is tightened so as to cause the casing to be stopped, the speed of the shaft 13 is reduced in accordance with the ratio of gearing. In case the disk 30 is braked fast by means of the brake strap 31, the power and the movement will be transmitted also to the casing, however, in opposite direction to the movement of the shaft 6.

A reversing of the movement may be obtained by coupling the casing to a shaft. By regulating mutually the brakes 29 and 31 the speed of the driven shaft may be varied within wide limits.

I claim:

1. A toothed planet gear, in which the planet pinions are provided with elastic centring rings loosely mounted on the hub of the pinions and adapted to be kept in frictional engagement with outer and inner roller races by the spring action of the rings.

2. A toothed planet gear comprising a central gear wheel, a number of planet pinions, an outer toothed ring, outer and inner roller races arranged laterally of the rims of said toothed ring and gear wheel respectively and the width of which is equal to the pitch diameter of said toothed ring and gear wheel respectively, and elastic centring rings loosely mounted on the hub of the planet pinions and adapted to be kept in frictional engagement with the outer and inner rollers by the spring action of the rings.

3. A toothed planet gear comprising a central gear wheel, a number of planet pinions, an outer toothed ring, outer and inner roller races arranged laterally of the rims of said toothed ring and gear wheel respectively and the width of which is equal to the pitch diameter of said toothed ring and gear wheel respectively, and elastic centring rings loosely mounted on the hub of the planet pinions, said rings being normally wider than the hub and having a thickness equal to the radial distance between the roller races and the hub of the planet pinions so as to fix the planet pinions radially in place between said outer and inner roller races.

4. A combined gearing and bearing for motors consisting of a planet gear mounted in one bearing bracket of the motor and comprising a central gear wheel fixed on the driving shaft of the motor, a number of planet pinions, mounted on a common support secured to the driven shaft of the motor, an internal tooth wheel, mounted in said bearing bracket, outer and inner roller races arranged laterally of the internal tooth wheel and the central gear wheel respectively, and centring rings loosely mounted on the hub of the planet pinions and arranged to roll on said outer and inner roller races.

5. A combined gearing and bearing for motors consisting of a planet gear mounted in one bearing bracket of the motor and comprising a central gear wheel fixed on the driving shaft of the motor, a number of planet pinions mounted on a common support secured to the driven shaft of the motor, an internal tooth wheel, mounted in said bearing bracket, outer and inner roller races arranged laterally of the rims of said internal tooth wheel and central gear wheel respectively and the width of which is equal to the pitch diameter of said internal tooth wheel and central gear wheel respectively, and elastic centring rings loosely mounted on the hub of the planet pinions, said rings being normally wider than the hub and having a thickness equal to the radial distance between the roller races and the hub of the planet pinions so as to fix the planet pinions radially in place between said outer and inner roller races.

6. A combined gearing and bearing as claimed in claim 4, in which the internal tooth wheel is rotatably mounted in the bearing bracket and arranged to be operated by elastic members tending to keep the wheel in a fixed position in relation to the bracket but allowing the wheel to yield to abnormal turning forces, said elastic members being provided in an annular groove formed between the tooth wheel and the bearing bracket and arranged to bear with their ends against projections or shoulders on the tooth wheel and the bearing bracket respectively, so as to be compressed between said projections or shoulders when the tooth wheel is being turned.

7. A toothed planet gear comprising a number of planet pinions, journals for said pinions mounted resiliently on a common support, and means for holding the journals in position comprising elastic members arranged so as to allow the journals to yield to tangential forces.

8. A toothed planet gear comprising a number of planet pinions, peripherally adjustable journals for said pinions secured on a common support, and means for fixing the journals in adjusted positions said means comprising elastic members arranged so as to allow the journals to yield to tangential forces.

9. A toothed planet gear comprising a number of planet pinions, journals for said pinions resiliently mounted on a common support, means for holding the journals in position, comprising elastic members arranged so as to allow the journals to yield to tangential forces, and spherical bearings between said pinions and journals.

10. A toothed planet gear comprising a number of planet pinions, journals for said pinions mounted on a common support and pivoted on radially extending pins and means for positioning and fixing the journals on the support.

11. A toothed planet gear as claimed in claim 10, in which the journals form one arm of a lever, the other arm of which is arranged to be set and fixed in position by means of set screws.

12. A toothed planet gear as claimed in claim 10, in which the journals form one arm of a lever, the other arm of which is arranged to be set and fixed in position by means of set screws, and in which the adjustable arm of the journals is elastic so as to yield to tangential pressures on the pinions.

13. A toothed planet gear comprising a number of planet pinions, journals secured to a common planet pinion support and adjustable peripherally in relation to each other, means for fixing the journals in adjusted positions and spherical bearings between said pinions and journals.

14. A toothed planet gear comprising a number of planet pinions, journals secured to a common planet pinion support and adjustable peripherally in relation to each other, means for fixing the journals in adjusted positions said means comprising elastic members arranged so as to allow the journals to yield to tangential forces, and spherical bearings between said pinions and journals.

In testimony whereof I affix my signature.

CARL ALRIK HULT.